(12) United States Patent
Kubota et al.

(10) Patent No.: US 8,792,186 B2
(45) Date of Patent: Jul. 29, 2014

(54) IMAGING LENS AND IMAGING DEVICE

(71) Applicants: Optical Logic Inc., Nagano (JP); Kantatsu Co., Ltd., Tochigi (JP)

(72) Inventors: Yoji Kubota, Nagano (JP); Kenichi Kubota, Nagano (JP); Hitoshi Hirano, Nagano (JP); Ichiro Kurihara, Tochigi (JP); Sayuri Noda, Tochigi (JP)

(73) Assignees: Optical Logic Inc., Ina (JP); Kantatsu Co., Ltd., Yaita (JP)

( * ) Notice: Subject to any disclaimer, the term of this patent is extended or adjusted under 35 U.S.C. 154(b) by 0 days.

(21) Appl. No.: 13/754,995

(22) Filed: Jan. 31, 2013

(65) Prior Publication Data

US 2013/0222927 A1 Aug. 29, 2013

(30) Foreign Application Priority Data

Feb. 28, 2012 (JP) ................. 2012-040877

(51) Int. Cl.
*G02B 3/02* (2006.01)
*G02B 13/02* (2006.01)
*G02B 9/12* (2006.01)

(52) U.S. Cl.
USPC ........... 359/716; 359/748; 359/784; 359/789; 359/792

(58) Field of Classification Search
USPC .................... 359/716, 748, 784, 789, 792
See application file for complete search history.

(56) References Cited

U.S. PATENT DOCUMENTS

| | | | | |
|---|---|---|---|---|
| 6,970,306 B2 * | 11/2005 | Matsuo | .......................... | 359/716 |
| 7,359,127 B2 * | 4/2008 | Saito et al. | .................... | 359/785 |
| 7,508,601 B2 * | 3/2009 | Murakami et al. | ............ | 359/791 |
| 7,894,141 B2 * | 2/2011 | Do | ................. | 359/716 |
| 8,194,172 B2 * | 6/2012 | Tang et al. | .................... | 348/340 |
| 8,331,036 B2 * | 12/2012 | Tang et al. | .................... | 359/716 |
| 8,355,213 B2 * | 1/2013 | Tang et al. | .................... | 359/716 |
| 8,576,500 B2 * | 11/2013 | Tang et al. | .................... | 359/716 |
| 2004/0264003 A1 * | 12/2004 | Noda | ............................. | 359/716 |
| 2007/0091468 A1 * | 4/2007 | Kubota et al. | ................. | 359/784 |
| 2008/0019023 A1 * | 1/2008 | Noda | ............................ | 359/784 |
| 2008/0212207 A1 * | 9/2008 | Taniyama | .................... | 359/784 |
| 2010/0165485 A1 * | 7/2010 | Do | ................. | 359/716 |
| 2010/0259838 A1 * | 10/2010 | Tsai et al. | .................... | 359/716 |
| 2011/0096221 A1 * | 4/2011 | Tsai | .............................. | 348/340 |
| 2011/0228157 A1 * | 9/2011 | Tang et al. | .................... | 348/340 |
| 2011/0279910 A1 * | 11/2011 | Tang et al. | .................... | 359/716 |

FOREIGN PATENT DOCUMENTS

JP 2012-014139 A 1/2012

* cited by examiner

*Primary Examiner* — Evelyn A. Lester
(74) *Attorney, Agent, or Firm* — Kubotera & Associates, LLC

(57) ABSTRACT

An imaging lens includes a first lens; a second lens; and a third lens arranged from an object side to an image plane side. The first lens has an object-side surface having a positive curvature radius $R1f$ and an image plane-side surface having a negative curvature radius $R1r$. The second lens has an object-side surface and an image plane-side surface with negative curvature radii. The third lens has an object-side surface and an image plane-side surface with positive curvature radii and formed as aspheric surfaces having inflexion points. When the whole lens system has a focal length f, the first lens has a focal length f1, the second lens has a focal length f2, and the third lens has a focal length f3, the imaging lens satisfies the following conditional expressions:

$f1 < f2 < f3$ $1.0 < f1/f < 1.5$ $-0.02 < R1f/R1r < 0$

7 Claims, 15 Drawing Sheets

IMAGING LENS AND IMAGING DEVICE

BACKGROUND OF THE INVENTION AND RELATED ART STATEMENT

The present invention relates to an imaging lens for forming an image on an imaging element such as a CCD sensor and a CMOS sensor and an imaging device equipped with the imaging lens. In particular, the present invention relates to an imaging lens suitable for mounting in a relatively small camera such as a cellular phone, a digital still camera, a portable information terminal, a security camera, an onboard camera, and a network camera. Further, the present invention relates to an imaging device equipped with the imaging lens.

In these years, in place of cellular phones, which are mainly used for making phone calls, so-called smart phones, i.e., cellular phones with functions as portable information terminals (PDA) or personal computers, have been more widely used. In general, due to the smart phones are highly-functional as compared to the cellular phones, it is possible to use images taken by a camera thereof in various applications. For example, in a case of the smartphone, although images are still viewed through printing as of its intended use, there are new additional ways of uses, such as fabrication of images to use in games, use of images for cosmetic makeup simulation, cloth fitting simulation, and the others. These new ways of uses that were not common before have been increasing each year.

Generally, an imaging lens for mounting in a cellular phone or a smartphone that is developed for an advanced user is required to have a lens configuration with high resolution so as to be applicable to an imaging element for high resolution that is available in these years. However, in a case of the imaging lens for mounting in the camera used for the above-described applications, it is more critical to be a small size with a wide angle of view, in other words, critical to have a wide angle, than having a high resolution.

Conventionally, there have been proposed various lens configurations. Among them, an imaging lens with a three-lens configuration has been used for many devices since aberrations thereof are relatively satisfactorily corrected and suitable for downsizing the imaging lens. As for the three lenses configuration, a well-known lens configuration includes a first lens having positive refractive power; a second lens having negative refractive power; and a third lens having positive or negative refractive power. According to the lens configuration, the second lens has negative refractive power. By having the configuration, accordingly, a chromatic aberration generated in the first lens is suitably corrected by the second lens, and it is simultaneously suitable for downsizing of the imaging lens.

However, in the above-described lens configuration, since the second lens has negative refractive power, in an attempt to attain both the downsizing of the imaging lens and the wide angle, it results in refractive power of each lens tends to be relatively strong, making it necessary to increase precision level for both in fabrication and assembling of the lens. For this reason, another lens configuration has been recently proposed, in which refractive powers of the three lenses are all positive.

As the imaging lens having the three-lens configuration, for example, an imaging lens described in below mentioned number of Patent Reference has been known. According to the imaging lens disclosed in Patent Reference, by having an inflection point on the second lens and the third lens, the downsizing of the imaging lens and the wide angle are attained while correcting aberrations thereof.

Patent Reference: Japanese Patent Application Publication No. 2012-14139

According to the imaging lens described in Patent Reference, it is achievable to reduce the size thereof while correcting aberrations and distortion at a certain level. However, according to the imaging lens, due to the whole lens system tends to have a long focal length, it results in an optical axis thereof has a long length. Accordingly, it makes difficult to meet the demands for the downsizing required in recent years. In addition, as described above, with diversification of camera uses, the imaging lens is required to have even a wider angle. Although the imaging lens described in Patent Reference has a wide angle compared with conventional lenses, however, in order to achieve wider angle, its limit for performance improvement is self-evident.

Here, a difficulty of attaining both the downsizing and the wide angle while satisfactorily correcting aberrations and distortion is not a problem only specific to the imaging lens mounted in the cellular phone and the smart phone, but also, it is a common problem even for an imaging lens mounted in a relatively small device such as a digital still camera, a portable information terminal, a security camera, a vehicle onboard camera, and a network camera.

In view of the problems of the conventional technology described above, the present invention objective is to provide an imaging lens capable of attaining both downsizing and a wide angle while satisfactorily correcting aberrations and distortion, and an imaging device equipped with the imaging lens.

Further objectives and advantages of the invention are shown from the following description of the invention.

SUMMARY OF THE INVENTION

In order to attain the objects described above, according to a first aspect of the present invention, an imaging lens includes a first lens having positive refractive power; a second lens having positive refractive power; and a third lens having positive refractive power, arranged in the order from an object side to an image plane side. The first lens has an object-side surface having a positive curvature radius and an image plane-side surface having a negative curvature radius. The second lens has an object-side surface and an image plane-side surface that have negative curvature radii. The third lens has an object-side surface and an image plane-side surface that have positive curvature radii. In addition, the object-side surface and the image plane-side surface of the third lens are respectively formed as aspheric surfaces having inflexion points.

According to the first aspect of the present invention, when the whole lens system has a focal length f, the first lens has a focal length f1, the second lens has a focal length f2, the third lens has a focal length f3, the object-side surface of the first lens has the curvature radius $R1f$, and the image plane-side surface of the first lens has the curvature radius $R1r$, the imaging lens of the present invention satisfies the following conditional expressions (1) to (3):

$$f1 < f2 < f3 \tag{1}$$

$$1.0 < f1/f < 1.5 \tag{2}$$

$$-0.02 < R1f/R1r < 0 \tag{3}$$

As described above, according to the imaging lens with the three-lens configuration, in which the second lens has negative refractive power, in an attempt to attain both downsizing of the imaging lens and the wider angle, refractive power of each lens tends to be relatively strong, consequently, making it necessary increase precision level for both in fabrication and assembling of the lens. According to the first aspect of the present invention, each of the first to third lenses of the imaging lens has positive refractive power, therefore, it is simultaneously achievable increasing the refractive power of the whole lens system and having relatively weak refractive power in each lens in which it enables to satisfactorily attain both the downsizing and a wide angle. In addition, since each lens composing the imaging lens has relatively weak refractive power, a surface shape of each lens are able to be formed in a gentle shape, it contributes to improve the yield performance both in fabrication and assembling of the imaging lens accordingly.

As shown in the conditional expression (1), according to the imaging lens of the present invention, by making the first lens have a stronger refractive power than that of the second lens and the third lens, it aims to attain the downsizing of the imaging lens. Moreover, according to the imaging lens of the present invention, aberrations and distortion are corrected by the second lens and the third lens, which have weaker refractive powers in comparison with the first lens.

In the imaging lens of the present invention, the second lens is formed in a shape in which both the object-side surface and the image plane-side surface have the negative curvature radius, and the third lens is formed in a shape in which both the object-side surface and the image plane-side surface have the positive curvature radius. In addition, the third lens is also formed as an aspheric shape, and respectively has an inflection point on the object-side surface and the image plane-side surface. Due to such shapes of the second lens and the third lens, it satisfactorily enables to correct the images on the image planes, aberrations and distortion, and furthermore, it enables to suitably restrain the incident angle of a light beam which runs from the imaging lens to an imaging element.

When the imaging lens satisfies the conditional expression (2), it enables to shorten an axial length (thickness) of the imaging lens and attain the downsizing of the imaging lens, while within a certain range restraining the incident angle of a light beam which runs from the imaging lens to an imaging element.

When the value exceeds the upper limit of "1.5" in the conditional expression (2), due to the first lens has relatively weak refractive power, a position of an exit pupil moves towards to the direction away from the image plane. For this reason, although it makes easier to restrain within a certain range the incident angle of a light beam which runs from the imaging lens to an imaging element and restrain to generate a spherical aberration, however, on the other hand, it makes difficult attain the downsizing of the imaging lens. Furthermore, since it makes the second lens and the third lens have relatively stronger refractive powers, it results in being difficult to restrain a chromatic aberration of magnification within a satisfactory range. On the other hand, when the value falls under the lower limit of "1.0", it makes the first lens has relatively stronger refractive power, it results in the position of the eye pupil moves towards the direction closer to the image plane. For this reason, although it is advantageous for the downsizing of the imaging lens, however, it makes difficult to restrain within a certain range the incident angle of the light beam which runs from the imaging lens to an imaging element.

When the imaging lens satisfies the conditional expression (3), it enables to restrain the spherical aberration and a field curvature within preferable ranges, while restraining within a certain range the incident angle of the light beam which runs from the imaging lens to an imaging element.

When the value exceeds the upper limit of "0" in the conditional expression (3), although it is advantageous for the downsizing of the imaging lens and correction of the coma aberration, it makes difficult to restrain within a certain range the incident angle of the light beam which runs from the imaging lens to an imaging element. In addition, it makes an extreme periphery of a tangential image plane be curved into a minus direction (to the object side), and it results in difficult to obtain satisfactory image-forming performance. On the other hand, when the value falls under the lower limit of "−0.02", due to the position of the exit pupil moves towards the direction away from the image plane, although it makes easier restrain within a certain range the incident angle of the light beam which runs from the imaging lens to an imaging element, however, it results in the spherical aberration being insufficiently corrected. Moreover, it results in increasing an off-axis coma aberration, and it ends to be difficult to obtain satisfactory image-forming performance.

According to a second aspect of the present invention, the imaging lens having the configuration in the first aspect may preferably satisfy the following conditional expression (4):

$$0.01 < f2/f3 < 0.05 \quad (4)$$

When the imaging lens satisfies the conditional expression (4), it enables to restrain curving of the images on the image plane while restraining within a certain range the incident angle of the light beam which runs from the imaging lens to an imaging element. When the value exceeds the upper limit of "0.05", it makes the third lens have stronger refractive power, and it results in being difficult to restrain curving of the images on the image plane. On the other hand, when the value falls under the lower limit of "0.01", it makes the third lens have weaker refractive power, although it makes easier restrain curving of the images on the image plane, however, it results in being difficult to restrain within a certain range the incident angle of the light beam which runs from the imaging lens to an imaging element.

According to a third aspect of the present invention, when a composite focal length of the second lens and the third lens is denoted as f23, the imaging lens having the configuration in the first aspect is preferably satisfied by the following conditional expression (5):

$$0.1 < f1/f23 < 0.4 \quad (5)$$

When the imaging lens satisfies the conditional expression (5), it enables to restrain the chromatic aberration and the astigmatism, while restraining within a certain range the incident angle of the light beam which runs from the imaging lens to an imaging element, and simultaneously it aims to attain the downsizing of the imaging lens.

When the value exceeds the upper limit of "0.4" in the conditional expression (5), it makes the first lens have relatively weaker refractive power, it results in the position of the exit pupil moves towards the direction away from the image plane. For this reason, although it makes easier restrain within a certain range the incident angle of the light beam which runs from the imaging lens to an imaging element, however, it results in increasing the astigmatism and it ends in being difficult to obtain satisfactory image-forming performance. On the other hand, when the value falls under the lower limit of "0.1", it makes the first lens have relatively stronger refractive power, it results in the position of the exit pupil moving towards the direction closer to the image plane. For this reason, although it is advantageous for correction of the astigmatism, it makes difficult restrain within a certain range the incident angle of the light beam which runs from the imaging lens to an imaging element. In addition, it results in the axial chromatic aberration being insufficiently corrected (a position of a focal point at a short wavelength moves towards the object side in relation to a position of a focal point at a reference wavelength), and it ends in being difficult to obtain satisfactory image-forming performance.

According to a fourth aspect of the present invention, when an axial length from the image plane-side surface of the first lens to the object-side surface of the second lens is denoted as D12, the imaging lens having the configuration in the first aspect is preferably satisfied by the following conditional expression (6):

$$0.2 < D12/f < 0.4 \quad (6)$$

When the imaging lens satisfies the conditional expression (6), it enables to restrain within preferable ranges the coma aberration and the astigmatism, while restraining within a certain range the incident angle of the light beam which runs from the imaging lens to an imaging element, and it also aims simultaneously to attain the downsizing of the imaging lens.

When the value exceeds the upper limit of "0.4" in the conditional expression (6), it makes easier to restrain within a certain range the incident angle of the light beam which runs from the imaging lens to an imaging element, and also it is advantageous for attaining the downsizing of the imaging lens. However, since it causes in increasing the astigmatism and the off-axis coma aberration, it results in being difficult to obtain satisfactory image-forming performance. On the other hand, when the value falls under the lower limit of "0.2", it makes difficult to restrain within a certain range the incident angle of the light beam which runs from the imaging lens to an imaging element. In addition, it also results in being difficult to restrain the astigmatism within satisfactory range and attaining the downsizing of the imaging lens. According to a fifth aspect of the present invention, in the imaging lens having the configuration in the first aspect, it is preferable to form the first lens to the third lens using a material with an Abbe's number greater than 50. When the Abbe's number of the first to third lenses of the imaging lens is increased, it enables to restrain generating the chromatic aberration.

According to a sixth aspect of the present invention, in the imaging lens having the configuration in the first aspect, it is preferable to form the first lens to the third lens using a same material. When the first to third lenses are formed of the same material, it enables to reduce the manufacturing cost of the imaging lens. In addition, in a conventional style, for the imaging lens being composed by using different types of material lenses, it used to require different types of the molds exclusively used for each material in its manufacturing, however, when it comes the lens manufacturing material type being limited to one type, it enables to manufacture all the lenses composing the imaging lens with one mold. Accordingly, for the imaging lens, it enables to improve the performance both in fabrication and assembling, simultaneously it contributes in increasing maintenance easiness and reducing maintenance costs, and consequently it results in reducing overall costs for the lens production in a preferable manner.

According to a seventh aspect of the present invention, an imaging device includes the imaging lens having the configuration in the first aspect; an imaging element having an image plane with a size under ⅕ inch (diagonal length is 3.6 mm) and resolution under 3 megapixel.

In these years, with the advancement of the downsizing a camera, a small-sized imaging element has been used being mounted in the camera. In combination of the imaging lens having the above-described configuration with the small-sized imaging element, it enables to restrain sensitivity to deterioration of image-forming performance due to so-called production error sensitivity, de-centering (axial displacement), tilting, and the others in the process of the imaging lens production. In addition, it is enables to restrain the field cur-vature and obtain stable image-forming performance in any image height of the image plane of the imaging element in a balanced manner.

Now, when the second lens has negative refractive power as in the case of the conventional configuration, the production error sensitivity tends to be high and it is difficult to restrain the manufacturing cost of the imaging lens. Moreover, although the peak of the resolution of the imaging lens improves, the resolution tends to decrease near the middle image height of the image plane of the imaging lens, resulting in being difficult to obtain stable image-forming performance balanced in any image heights.

For the reason described above, in the imaging device of the present invention, in the imaging lens with the above-described configuration, by combining the imaging element with the size of under ⅕ inch and resolution under 3 megapixel, accordingly, it enables to suitably restrain the manufacturing cost of the imaging lens while satisfactorily correcting aberrations.

According to the imaging lens of the invention, it is achievable to provide the imaging lens and the imaging device equipped with the imaging lens in which both the downsizing and the wide angle are attainable, while satisfactorily correcting aberrations and distortion.

DETAILED DESCRIPTION OF PREFERABLE EMBODIMENTS

Hereunder, embodiments of the present invention will be fully described by means of referring to the accompanied drawings.

FIGS. 1, 4, 7, 10, and 13 are the schematic sectional views of the image lenses of which its data are respectively shown in Numerical Data Examples 1 to 5 in relation to the present embodiment.

Since each basic lens configuration in the embodiments described in Numerical Data Examples 1 to 5 is the same, the lens configuration of the embodiments will be explained by taking a reference with the lens schematic sectional view of Numerical Data Example 1.

Figure 1:
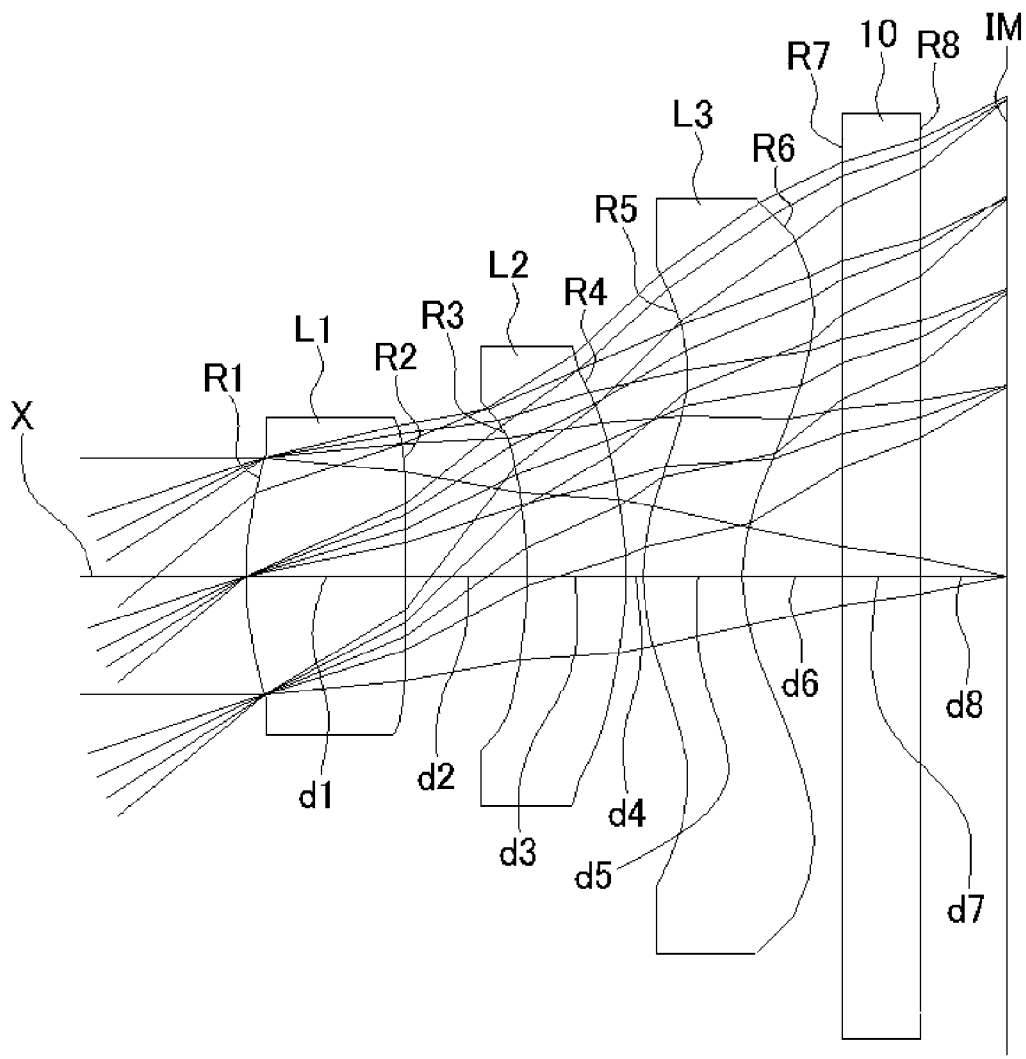
FIG. 1 is a schematic sectional view showing a configuration of an imaging lens in Numerical Data Example 1.

Like as shown in FIG. 1, the imaging lens of the embodiment has a first lens L1 having positive refractive power; a second lens L2 having positive refractive power; and a third lens L3 having positive refractive power, which are arranged in this order from an object side to an image side of the imaging lens. The lens L1 to the lens L3 are made of a material with Abbe's number larger than of 50. A filter 10 is placed between the third lens L3 and an image plane IM. Whether or not placing the filter 10 is selectable upon a choice. In addition, the imaging lens of this embodiment has an aperture stop on an object-side surface of the first lens L1.

The first lens L1 is formed in a shape in which a curvature radius R1 of an object-side surface thereof is positive and a curvature radius R2 of an image plane-side surface thereof is negative and is formed in a shape of a biconvex lens near the optical axis X. The second lens L2 is formed in a shape in which a curvature radius R3 of an object-side surface thereof and a curvature radius R4 of an image plane-side surface thereof are both negative and is formed in a shape of a meniscus lens directing a concave surface thereof to the object side near the optical axis X. The third lens L3 is formed in a shape in which a curvature radius R5 of the object-side surface thereof and a curvature radius R6 of an image plane-side surface thereof are both positive and formed in a shape of a meniscus lens directing a convex surface thereof to the object side. Among them, the third lens L3 is formed in a shape of an aspheric, and respectively has an inflexion point on the object-side surface and the image plane-side surface thereof. According to the present embodiment, the third lens L3 is formed in a shape of an aspheric in which the object-side surface thereof and the image plane-side surface thereof are both convex to the object side near the optical axis X and simultaneously concave to the object side on the periphery. With above described surface shape of the third lens L3, it enables to suitably restrain the incident angle of a light beam which runs from the imaging lens to the imaging plane IM within a certain range.

Furthermore, the imaging lens of the present embodiment satisfies the following conditional expressions (1) to (6):

$$f1 < f2 < f3 \quad (1)$$

$$1.0 \leq f1/f < 1.5 \quad (2)$$

$$-0.02 < R1f/R1r < 0 \quad (3)$$

$$0.01 \leq f2/f3 < 0.05 \quad (4)$$

$$0.1 \leq f1/f23 < 0.4 \quad (5)$$

$$0.2 < D12/f < 0.4 \quad (6)$$

In the above expressions,
f: Focal length of the whole lens system
f1: Focal length of the first lens L1
f2: Focal length of the second lens L2
f3: Focal length of the third lens L3
f23: Composite focal length of the second lens L2 and the third lens L3
R1f: Curvature radius of an object-side surface of the first lens L1
R1r: Curvature radius of an image plane-side surface of the first lens L1
D12: Axial distance from the image plane-side surface of the first lens L1 to the object-side surface of the second lens L2

Here, it is not necessary to simultaneously satisfy all of the above conditional expressions, and therefore, in a case any single one of the conditional expressions selected is individually satisfied, consequently it enables to obtain the effects corresponding to the respective conditional expression.

In the present embodiment, all lens surfaces of the first lens L1 to the third lens L3 are formed to be the aspheric surfaces. When the aspheric surfaces applied to the lens surfaces have an axis Z in the optical axis X direction, a height H in a direction perpendicular to the optical axis X, a conical coefficient k, and aspheric surface coefficients $A_4$, $A_6$, $A_8$, $A_{10}$, $A_{12}$, $A_{14}$, and $A_{16}$, the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$ [Formula 1]

Next, Numerical Data Examples of the embodiment will be described. In each of Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (a surface spacing) along the optical axis, Nd represents a refractive index for a d line, and vd represents Abbe's number for the d line. Here, the aspheric surfaces are indicated with surface numbers affixed with * (asterisk).

Numerical Data Example 1
Basic lens data are shown below.

f = 1.54 mm, Fno = 2.4, ω = 39.9°
Unit: mm

Surface Data

| Surface Number i | R | d | Nd | vd |
| --- | --- | --- | --- | --- |
| (Object) | ∞ | ∞ | | |
| 1* (Stop) | 0.994 (=R1f) | 0.430 | 1.5351 | 56.1 |
| 2* | −122.694 (=R1r) | 0.327 (=D12) | | |
| 3* | −1.105 | 0.269 | 1.5351 | 56.1 |
| 4* | −1.024 | 0.045 | | |
| 5* | 0.596 | 0.267 | 1.5351 | 56.1 |
| 6* | 0.504 | 0.270 | | |
| 7 | ∞ | 0.210 | 1.5163 | 64.1 |
| 8 | ∞ | 0.236 | | |
| (Image plane) | ∞ | | | | f1 = 1.84 mm
f2 = 12.11 mm
f3 = 525.79 mm
f23 = 10.01 mm

Aspheric Surface Data

First Surface k = −3.452, $A_4$ = 1.166E−01, $A_6$ = 1.584, $A_8$ = −2.089E+01, $A_{10}$ = 3.423E+01, $A_{12}$ = −5.938E+02, $A_{14}$ = 5.115E+03

Second Surface k = 0.000, $A_4$ = 2.511E−01, $A_6$ = −7.503, $A_8$ = 5.877, $A_{10}$ = 1.418E+01, $A_{12}$ = 2.434E+02, $A_{14}$ = −1.550E+03

-continued f = 1.54 mm, Fno = 2.4, ω = 39.9°
Unit: mm

Third Surface k = −3.239E+01, $A_4$ = −3.275E−01, $A_6$ = 5.472, $A_8$ = −9.507E+01, $A_{10}$ = 4.654E+02, $A_{12}$ = −1.601E+03, $A_{14}$ = 2.496E+03, $A_{16}$ = −1.178E+03
Fourth Surface k = 9.010E−01, $A_4$ = 1.547, $A_6$ = −4.148, $A_8$ = −1.371, $A_{10}$ = 1.103E+01, $A_{12}$ = 9.838, $A_{14}$ = 1.640E+01, $A_{16}$ = −2.127E+01
Fifth Surface k = −1.707, $A_4$ = −1.048, $A_6$ = −6.193E−01, $A_8$ = 6.707E−01, $A_{10}$ = 2.123, $A_{12}$ = −8.898E−01, $A_{14}$ = −1.673, $A_{16}$ = 4.821E−01
Sixth Surface k = −1.629, $A_4$ = −1.271, $A_6$ = 1.200, $A_8$ = −5.576E−01, $A_{10}$ = −9.666E−02, $A_{12}$ = −1.333E−01, $A_{14}$ = 5.410E−01, $A_{16}$ = −3.105E−01

The values of the respective conditional expressions are as follows:

$f1/f = 1.20$ $R1f/R1r = -0.008$ $f2/f3 = 0.023$ $f1/f23 = 0.18$ $D12/f = 0.21$

Accordingly, the imaging lens of Numerical Data Example 1 satisfies the conditional expressions (1) to (6). In addition, a distance along the optical axis X (length in air) from the object-side surface of the first lens L1 to the image plane IM is 1.98 mm, and therefore the size of the imaging lens is suitably reduced. Here, each lens that composes the imaging lens in Numerical Example 1 is made of the same material, so that the manufacturing cost of the imaging lens is suitably restrained.

Figure 2:
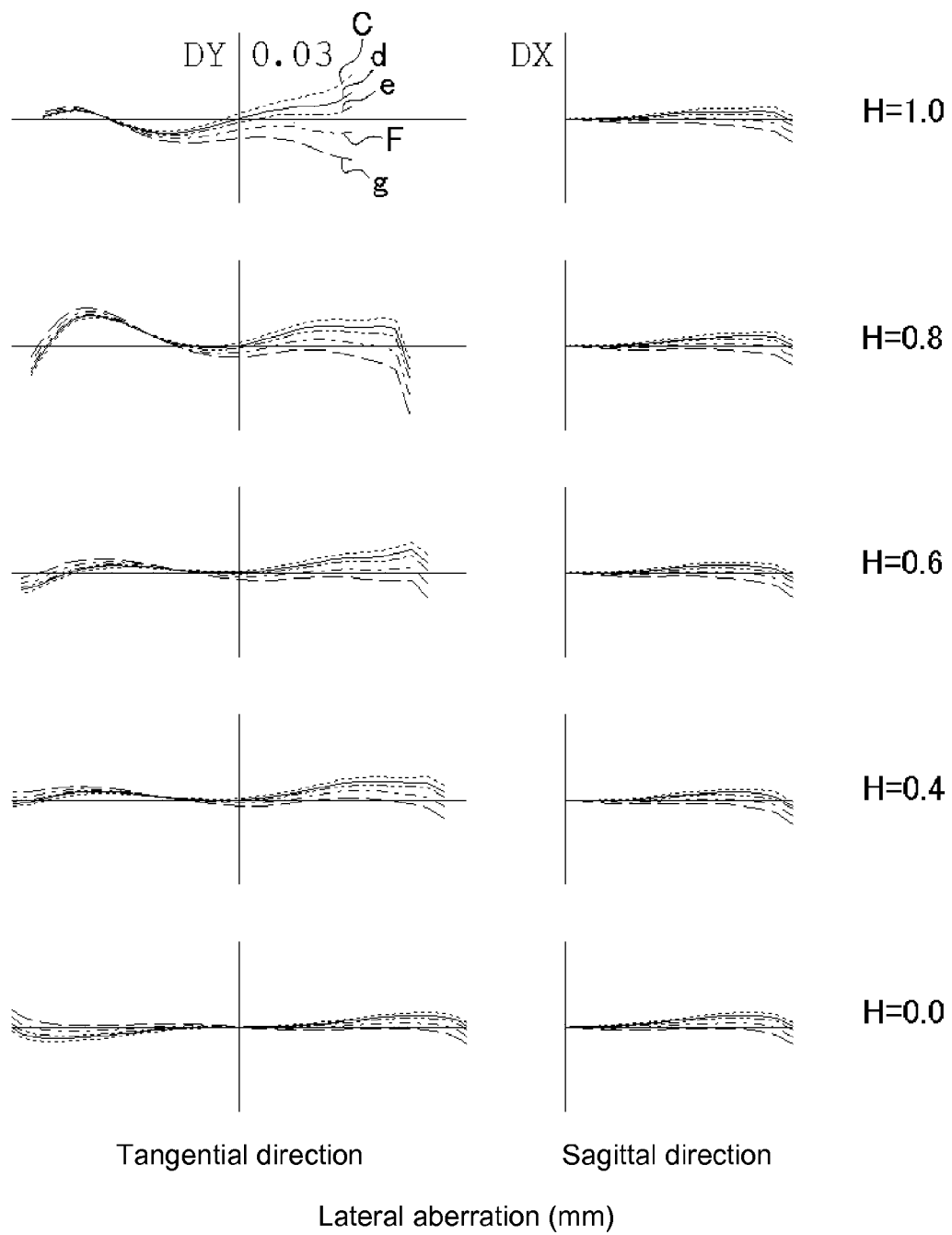
FIG. 2 is an aberration diagram showing a lateral aberration of the imaging lens of FIG. 1.
Figure 3:
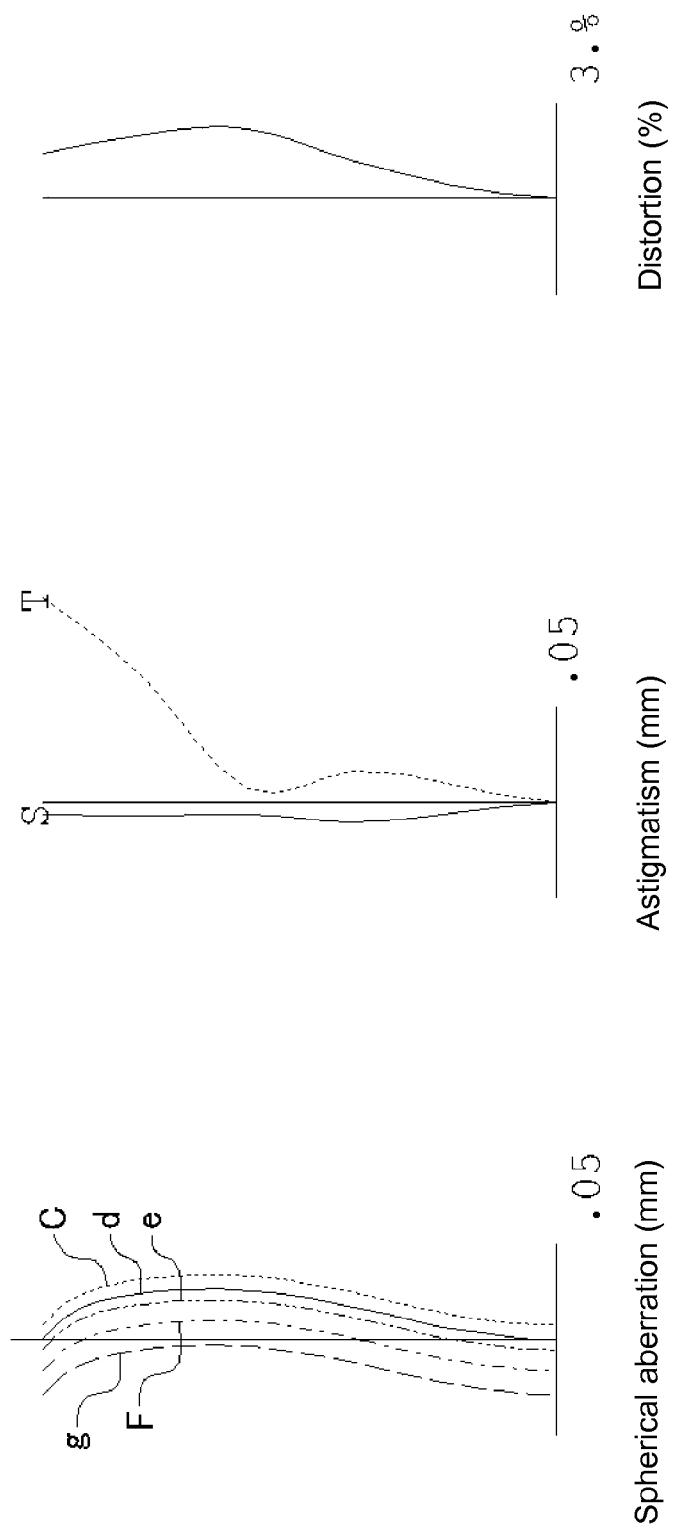
FIG. 3 is an aberration diagram showing a spherical aberration, an astigmatism, and a distortion of the imaging lens of FIG. 1.
Figure 4:
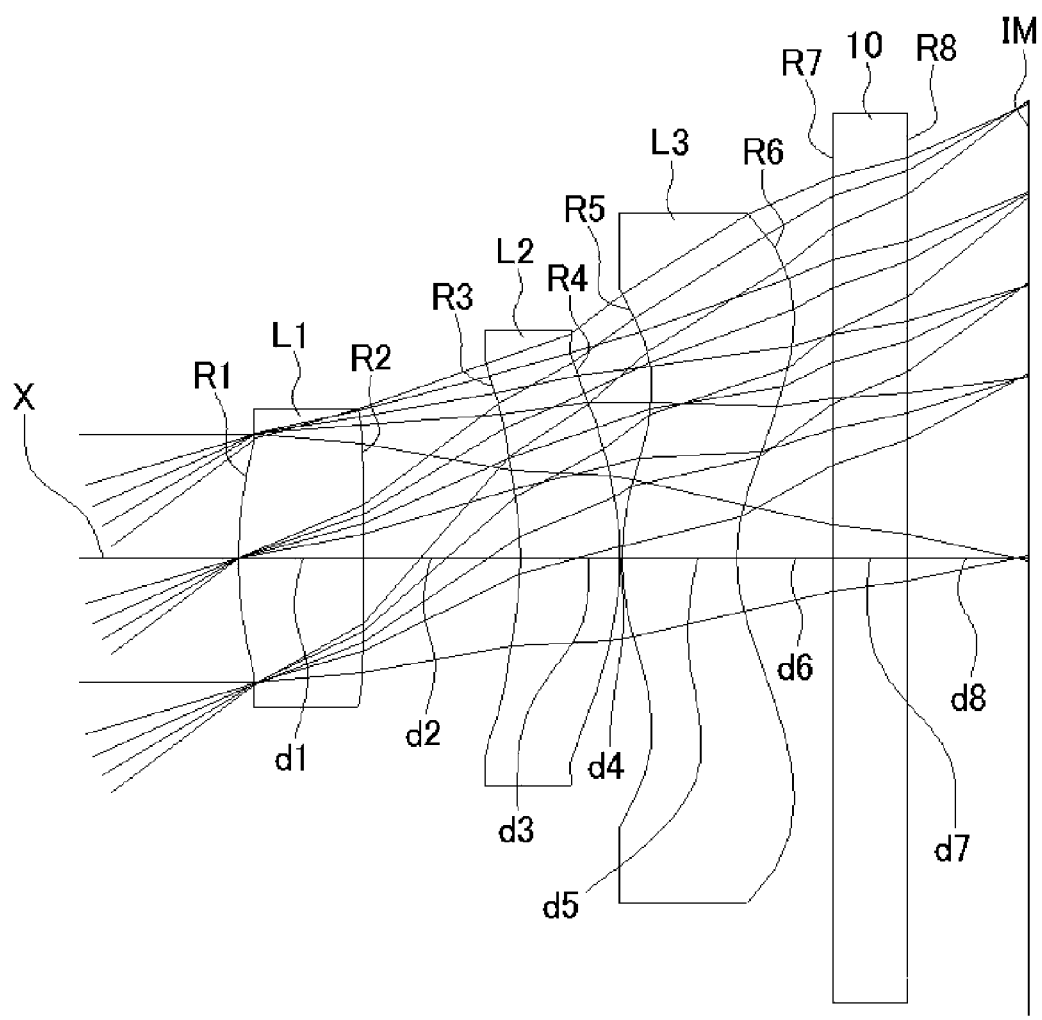
FIG. 4 is a schematic sectional view showing a configuration of an imaging lens in Numerical Data Example 2.

FIG. 2 shows the lateral aberration that corresponds to a ratio H of each image height to the maximum image height (hereinafter referred to as "an image height ratio H") in the imaging lens of Numerical Data Example 1 by dividing into a tangential direction and sagittal direction (which is also the same in FIGS. 5, 8, 11, and 14). Furthermore, FIG. 3 shows a spherical aberration (mm), an astigmatism (mm), and a distortion (%), respectively. In the aberration diagrams, the aberrations at the respective wavelengths of a g line (435.84 nm), an F line (486.13 nm), an e line (546.07 nm), a d line (587.56 nm), and a C line (656.27 nm) are indicated in the spherical aberration diagram. Further, in the astigmatism diagram, the aberration on the sagittal image surface S and the aberration on tangential image surface T are respectively indicated (which are the same in FIGS. 6, 9, 12, and 15). As shown in FIGS. 2 and 3, according to the imaging lens of Numerical Data Example 1, the respective aberrations are suitably corrected.

Numerical Data Example 2

Basic lens data are shown below.

f = 1.68 mm, Fno = 2.4, ω = 37.3°
Unit: mm

Surface Data

| Surface Number i | R | d | Nd | vd |
|---|---|---|---|---|
| (Object) | ∞ | ∞ | | |
| 1* (Stop) | 1.135 (=R1f) | 0.351 | 1.5351 | 56.1 |
| 2* | −117.527 (=R1r) | 0.442 (=D12) | | |
| 3* | −0.959 | 0.281 | 1.5351 | 56.1 |
| 4* | −0.899 | 0.005 | | |
| 5* | 0.651 | 0.324 | 1.5351 | 56.1 |
| 6* | 0.539 | 0.270 | | |
| 7 | ∞ | 0.210 | 1.5163 | 64.1 |
| 8 | ∞ | 0.340 | | |
| (Image plane) | ∞ | | | | f1 = 2.10 mm
f2 = 10.21 mm
f3 = 823.15 mm
f23 = 8.35 mm

Aspheric Surface Data

First Surface k = −3.069, $A_4$ = 2.647E−02, $A_6$ = 1.627, $A_8$ = −2.567E+01, $A_{10}$ = 6.528E+01, $A_{12}$ = 6.762E+01, $A_{14}$ = 6.679E+02
Second Surface k = −1.596E+06, $A_4$ = 1.385E−01, $A_6$ = −4.499, $A_8$ = 1.158E+01, $A_{10}$ = −2.136E+01, $A_{12}$ = 5.638E+01, $A_{14}$ = −1.319E+02
Third Surface k = −2.067E+01, $A_4$ = −7.233E−02, $A_6$ = 6.855, $A_8$ = −9.090E+01, $A_{10}$ = 4.875E+02, $A_{12}$ = −1.482E+03, $A_{14}$ = 2.737E+03, $A_{16}$ = −2.398E+03
Fourth Surface k = 8.220E−01, $A_4$ = 1.261, $A_6$ = −2.709, $A_8$ = 8.778E−01, $A_{10}$ = 1.052E+01, $A_{12}$ = 6.771, $A_{14}$ = 1.332E+01, $A_{16}$ = −1.343E+01
Fifth Surface k = −3.221, $A_4$ = −9.481E−01, $A_6$ = −7.728E−01, $A_8$ = 4.424E−01, $A_{10}$ = 2.333, $A_{12}$ = −1.579E−01, $A_{14}$ = −1.130, $A_{16}$ = −4.095E−01
Sixth Surface k = −2.418, $A_4$ = −1.019, $A_6$ = 9.923E−01, $A_8$ = −5.627E−01, $A_{10}$ = −3.929E−02, $A_{12}$ = −1.231E−01, $A_{14}$ = 5.042E−01, $A_{16}$ = −3.064E−01

The values of the respective conditional expressions are as follows:

$f1/f = 1.25$ $R1f/R1r = -0.010$ $f2/f3 = 0.012$ $f1/f23 = 0.25$ $D12/f = 0.26$

Therefore, the imaging lens of Numerical Data Example 2 satisfies the conditional expressions (1) to (6). In addition, a distance along the optical axis X from the object-side surface of the first lens L1 (length in air) to the image plane IM is 2.15 mm, and therefore the size of the imaging lens is suitably reduced. Here, each lens that composes the imaging lens in Numerical Example 2 is also made of the same material, so that the manufacturing cost of the imaging lens is suitably restrained.

Figure 5:
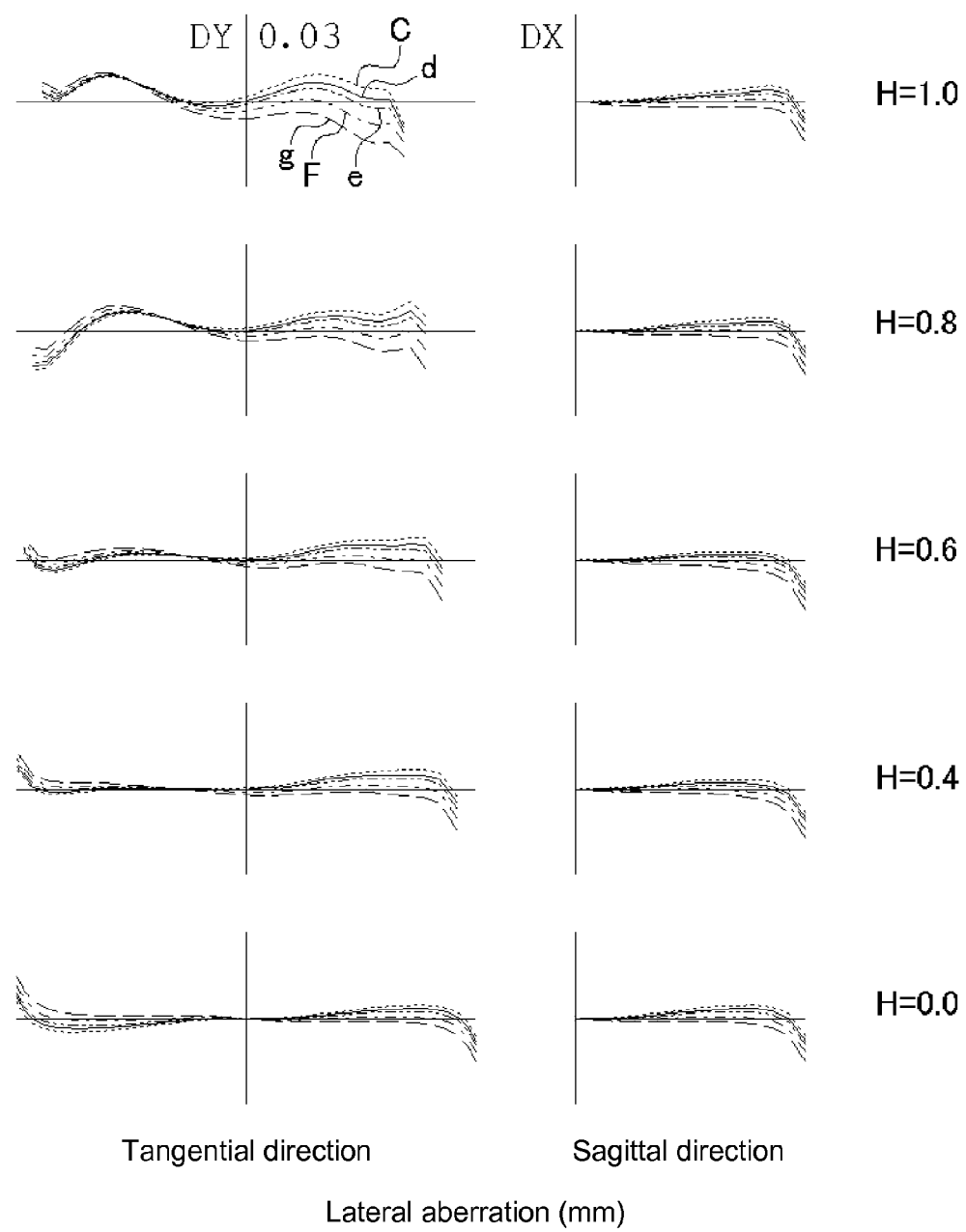
FIG. 5 is an aberration diagram showing a lateral aberration of the imaging lens of FIG. 4.
Figure 6:
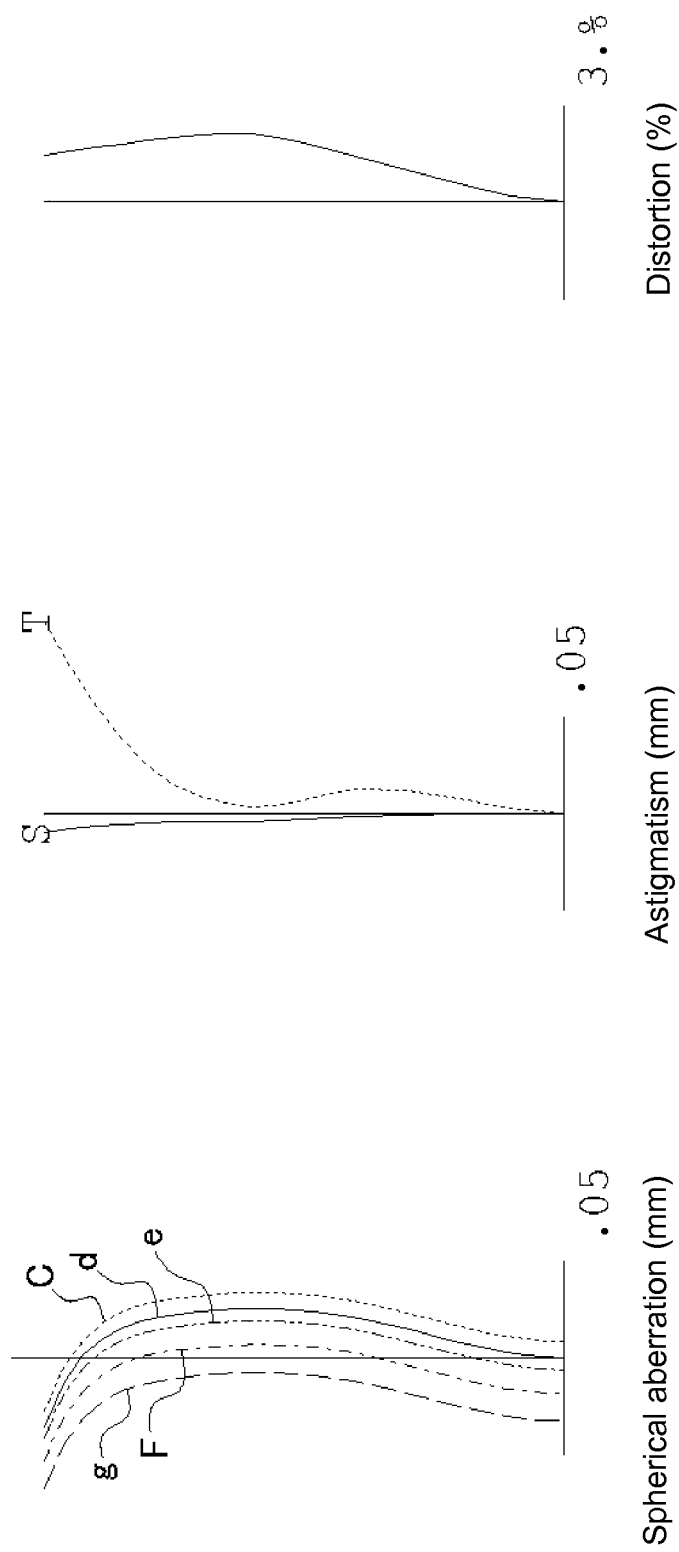
FIG. 6 is an aberration diagram showing a spherical aberration, an astigmatism, and a distortion of the imaging lens of FIG. 4.
Figure 7:
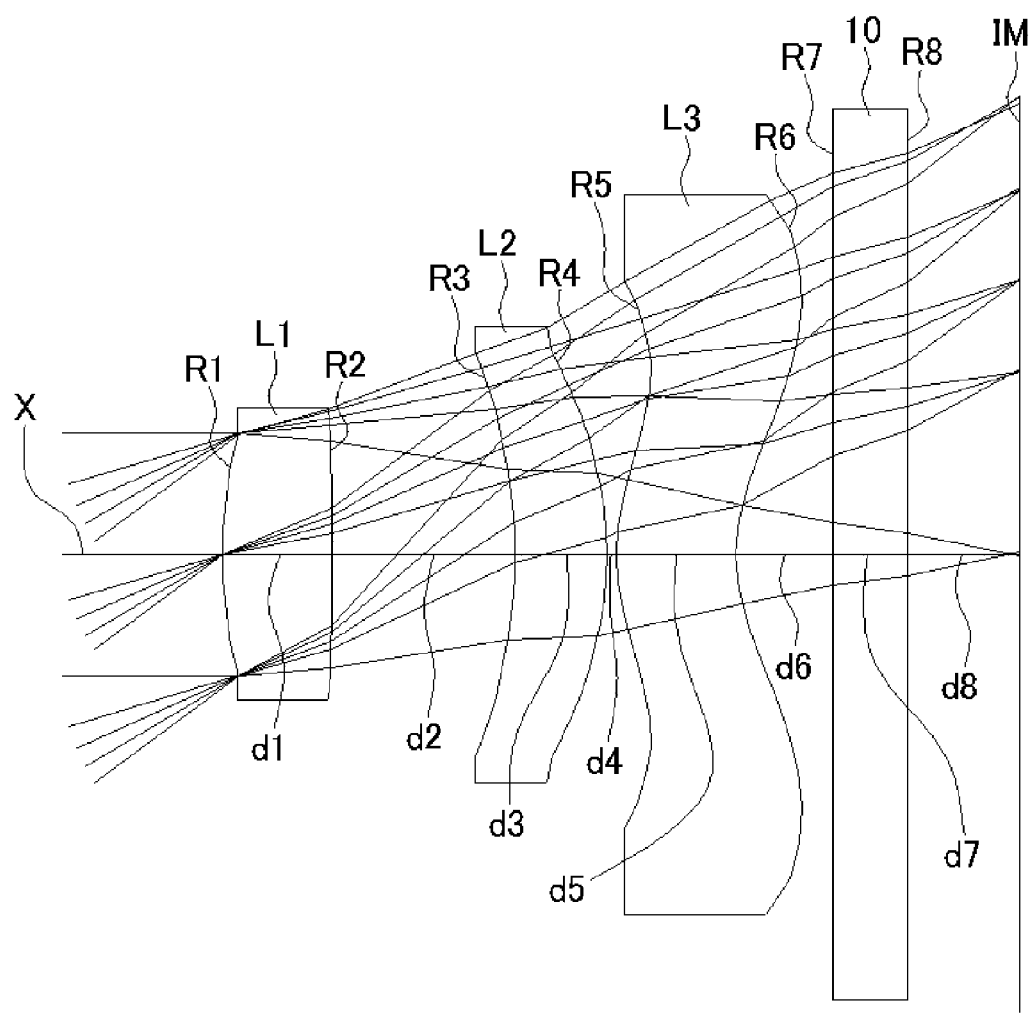
FIG. 7 is a schematic sectional view showing a configuration of an imaging lens in Numerical Data Example 3.

FIG. 5 is an aberration diagram showing the lateral aberration that corresponds to an image height ratio H, and FIG. 6 is an aberration diagram showing a spherical aberration (mm), an astigmatism (mm), and a distortion (%), respectively. As shown in FIGS. 5 and 6, in the imaging lens of Numerical Data Example 2, the respective aberrations are also suitably corrected.

Numerical Data Example 3

Basic lens data are shown below.

f = 1.70 mm, Fno = 2.5, ω = 37.1°
Unit: mm

Surface Data

| Surface Number i | R | d | Nd | νd |
|---|---|---|---|---|
| (Object) | ∞ | ∞ | | |
| 1* (Stop) | 1.194 (=R1f) | 0.307 | 1.5351 | 56.1 |
| 2* | −102.226 (32 R1r) | 0.515 (=D12) | | |
| 3* | −0.983 | 0.258 | 1.5351 | 56.1 |
| 4* | −0.899 | 0.026 | | |
| 5* | 0.636 | 0.334 | 1.5351 | 56.1 |
| 6* | 0.522 | 0.270 | | |
| 7 | ∞ | 0.210 | 1.5163 | 64.1 |
| 8 | ∞ | 0.317 | | |
| (Image plane) | ∞ | | | | f1 = 2.21 mm
f2 = 9.51 mm
f3 = 249.03 mm
f23 = 7.52 mm

Aspheric Surface Data

First Surface $k = -3.175, A_4 = 7.502E-03, A_6 = 1.327, A_8 = -2.634E+01, A_{10} = 8.009E+01, A_{12} = 3.973E+01, A_{14} = 7.143E+02$ Second Surface $k = -3.911E+06, A_4 = 8.092E-02, A_6 = -4.400, A_8 = 1.353E+01, A_{10} = -2.213E+01, A_{12} = -1.271E+01, A_{14} = -2.549E+01$ Third Surface $k = -2.052E+01, A_4 = -1.060E-01, A_6 = 6.837, A_8 = -9.128E+01, A_{10} = 4.858E+02, A_{12} = -1.486E+03, A_{14} = 2.741E+03, A_{16} = -2.320E+03$ Fourth Surface $k = 7.532E-01, A_4 = 1.177, A_6 = -2.841, A_8 = 6.766E-01, A_{10} = 1.016E+01, A_{12} = 6.084, A_{14} = 1.070E+01, A_{16} = -2.042E+01$ Fifth Surface $k = -2.887, A_4 = -9.250E-01, A_6 = -6.394E-01, A_8 = 5.661E-01, A_{10} = 2.338, A_{12} = -2.299E-01, A_{14} = -1.546, A_{16} = -1.727$ Sixth Surface $k = -2.155, A_4 = -1.029, A_6 = 1.033, A_8 = -5.304E-01, A_{10} = -4.247E-02, A_{12} = -1.399E-01, A_{14} = 5.031E-01, A_{16} = -2.824E-01$ The values of the respective conditional expressions are as follows:

$f1/f = 1.30$ $R1f/R1r = -0.012$ $f2/f3 = 0.038$ $f1/f23 = 0.29$ $D12/f = 0.30$

Therefore, the imaging lens of Numerical Data Example 3 satisfies the conditional expressions (1) to (6). In addition, a distance along the optical axis X from the surface of the first lens L1 (length in air) on the object side to the image plane IM is 2.17 mm, and therefore the size of the imaging lens is suitably reduced. Here, each lens that composes the imaging lens in Numerical Example 3 is also made of the same material, so that the manufacturing cost of the imaging lens is suitably restrained.

Figure 8:
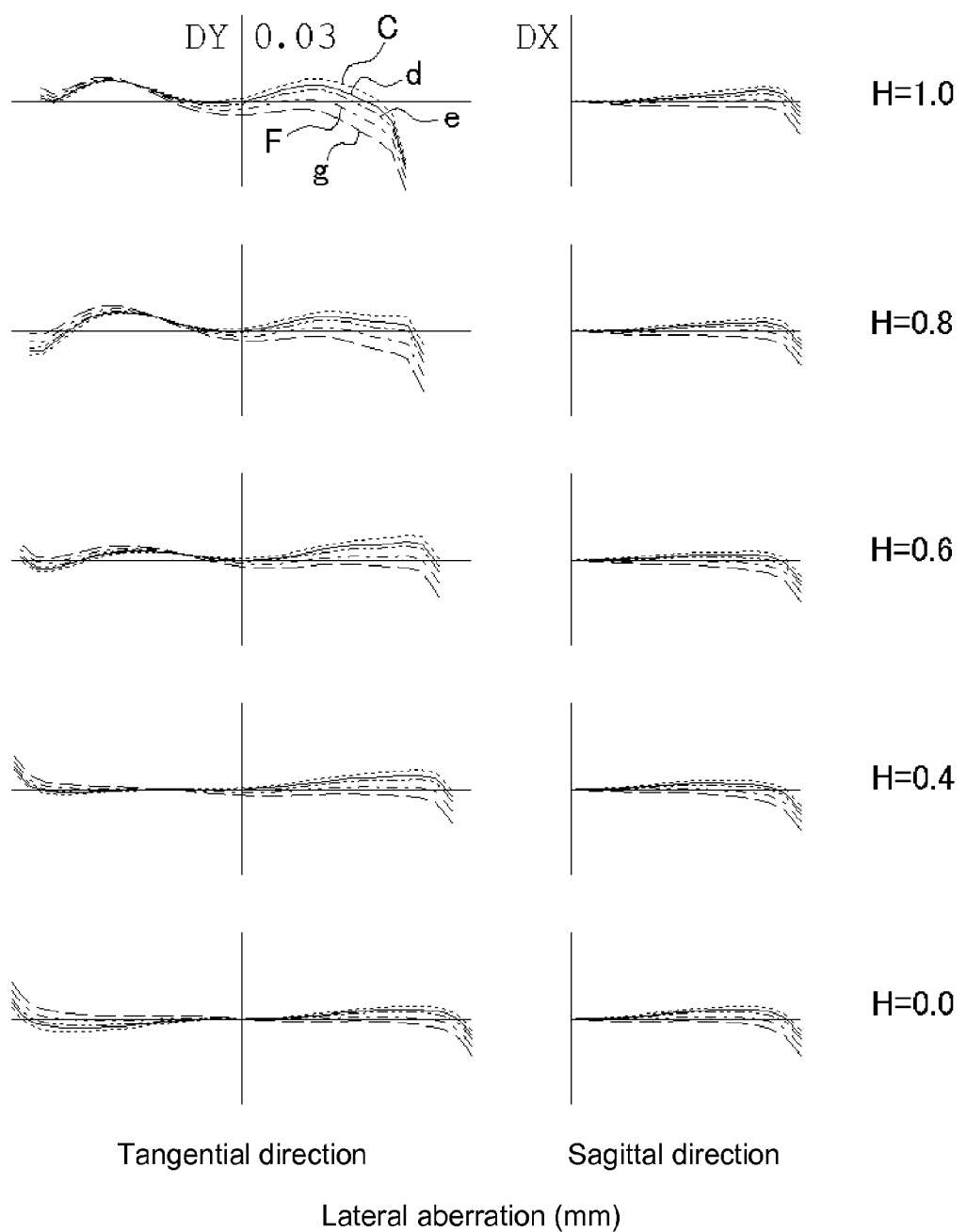
FIG. 8 is an aberration diagram showing a lateral aberration of the imaging lens of FIG. 7.
Figure 9:
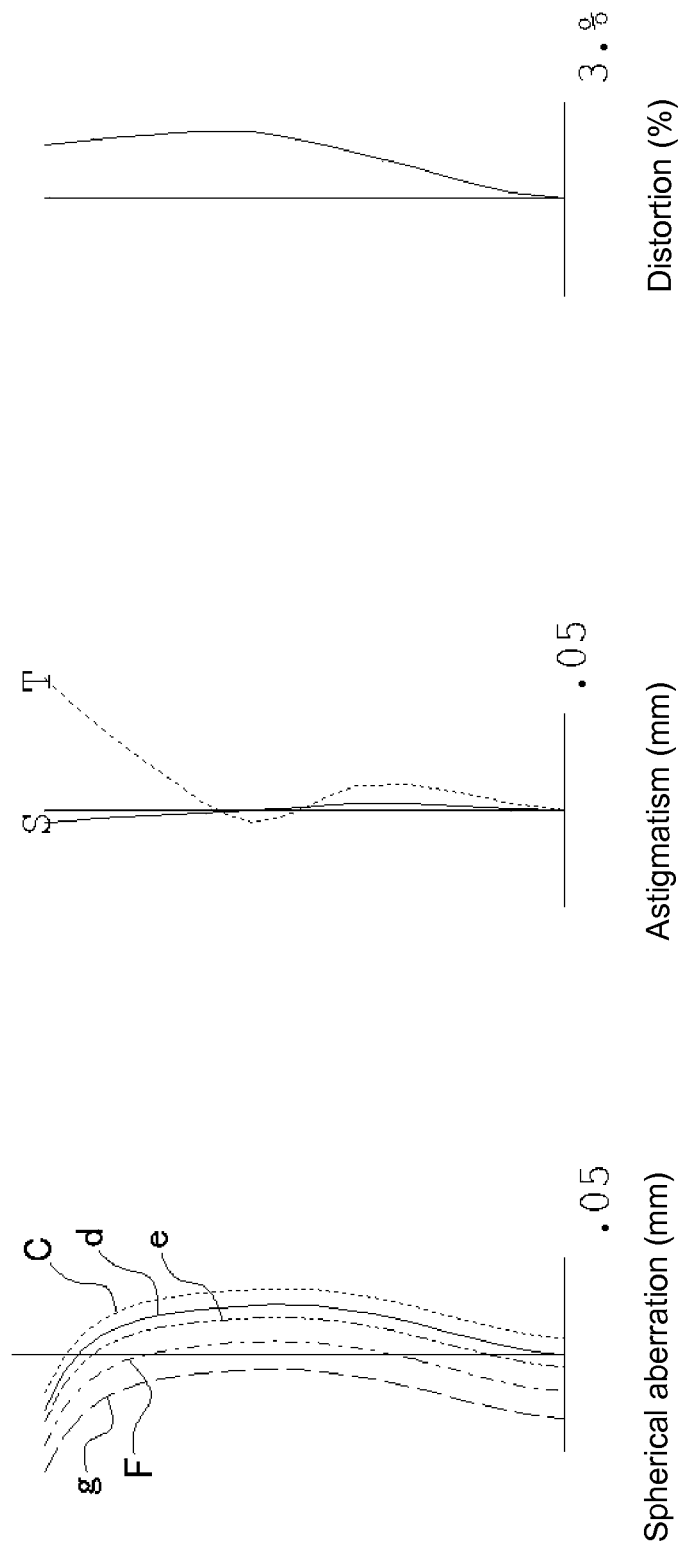
FIG. 9 is an aberration diagram showing a spherical aberration, an astigmatism, and a distortion of the imaging lens of FIG. 7.
Figure 10:
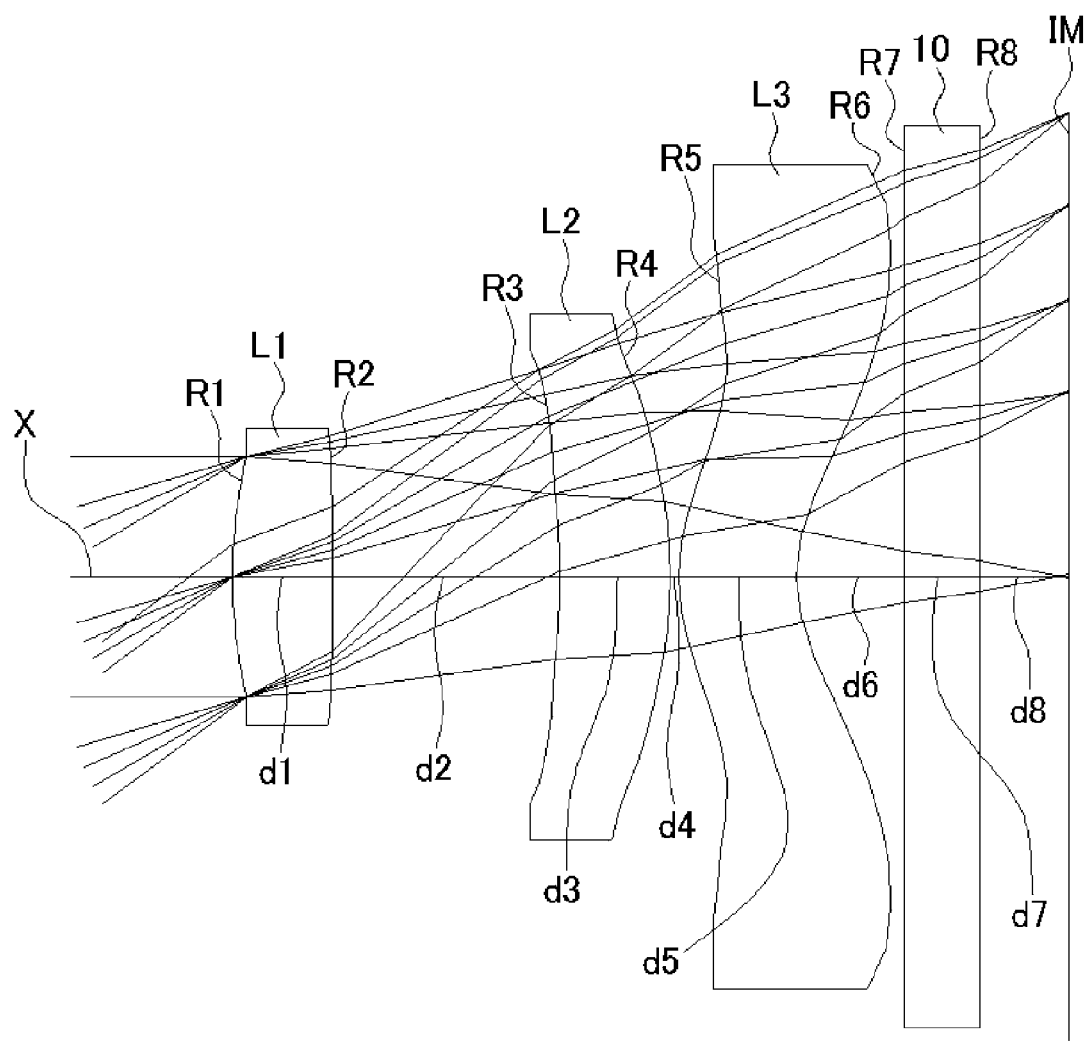
FIG. 10 is a schematic sectional view showing a configuration of an imaging lens in Numerical Data Example 4.

FIG. 8 is an aberration diagram showing the lateral aberration that corresponds to an image height ratio H, and FIG. 9 is aberration diagram showing a spherical aberration (mm), an astigmatism (mm), and a distortion (%), respectively. As shown in FIGS. 8 and 9, in the imaging lens of Numerical Data Example 3, the respective aberrations are also suitably corrected.

Numerical Data Example 4

Basic lens data are shown below.

f = 1.73 mm, Fno = 2.6, ω = 36.7°
Unit: mm

Surface Data

| Surface Number i | R | d | Nd | νd |
|---|---|---|---|---|
| (Object) | ∞ | ∞ | | |
| 1* (Stop) | 1.305 (=R1f) | 0.276 | 1.5351 | 56.1 |
| 2* | −86.999 (32 R1r) | 0.631 (=D12) | | |
| 3* | −1.405 | 0.305 | 1.5351 | 56.1 |
| 4* | −1.150 | 0.022 | | |
| 5* | 0.548 | 0.326 | 1.5351 | 56.1 |
| 6* | 0.437 | 0.300 | | |
| 7 | ∞ | 0.210 | 1.5163 | 64.1 |
| 8 | ∞ | 0.246 | | |
| (Image plane) | ∞ | | | | f1 = 2.41 mm
f2 = 8.36 mm
f3 = 176.99 mm
f23 = 6.38 mm

Aspheric Surface Data

First Surface $k = -3.927, A_4 = 2.461E-01, A_6 = -6.897, A_8 = 5.891E+01, A_{10} = 9.943E+01, A_{12} = -5.471E+03, A_{14} = 2.559E+04$ Second Surface $k = -1.245E+06, A_4 = 4.400E-01, A_6 = -1.670E+01, A_8 = 1.657E+02, A_{10} = -6.387E+02, A_{12} = -9.623E+02, A_{14} = 8.377E+03$ Third Surface $k = -5.305E+01, A_4 = 3.366E-01, A_6 = 5.933, A_8 = -8.845E+01, A_{10} = 4.947E+02, A_{12} = -1.536E+03, A_{14} = 2.553E+03, A_{16} = -1.753E+03$ Fourth Surface $k = 1.151, A_4 = 1.026, A_6 = -1.935, A_8 = -3.335E-01, A_{10} = 3.293, A_{12} = 1.484, A_{14} = 1.349E+01, A_{16} = -2.044E+01$ Fifth Surface $k = -2.634, A_4 = -8.484E-01, A_6 = -1.863E-01, A_8 = 2.161E-01, A_{10} = 1.638, A_{12} = -3.777E-01, A_{14} = -1.613, A_{16} = 7.106E-01$ Sixth Surface $k = -2.189, A_4 = -9.167E-01, A_6 = 9.765E-01, A_8 = -4.123E-01, A_{10} = -6.348E-02, A_{12} = -2.245E-01, A_{14} = 4.761E-01, A_{16} = -1.999E-01$ The values of the respective conditional expressions are as follows:

$f1/f=1.39$ $R1f/R1r=-0.015$ $f2/f3=0.047$ $f1/f23=0.38$ $D12/f=0.36$

Therefore, the imaging lens of Numerical Data Example 4 satisfies the conditional expressions (1) to (6). In addition, a distance along the optical axis X from the object-side surface of the first lens L1 (length in air) to the image plane IM is 2.24 mm, and therefore the size of the imaging lens is suitably reduced. Here, each lens that composes the imaging lens in Numerical Example 4 is also made of the same material, so that the manufacturing cost of the imaging lens is suitably restrained.

Figure 11:
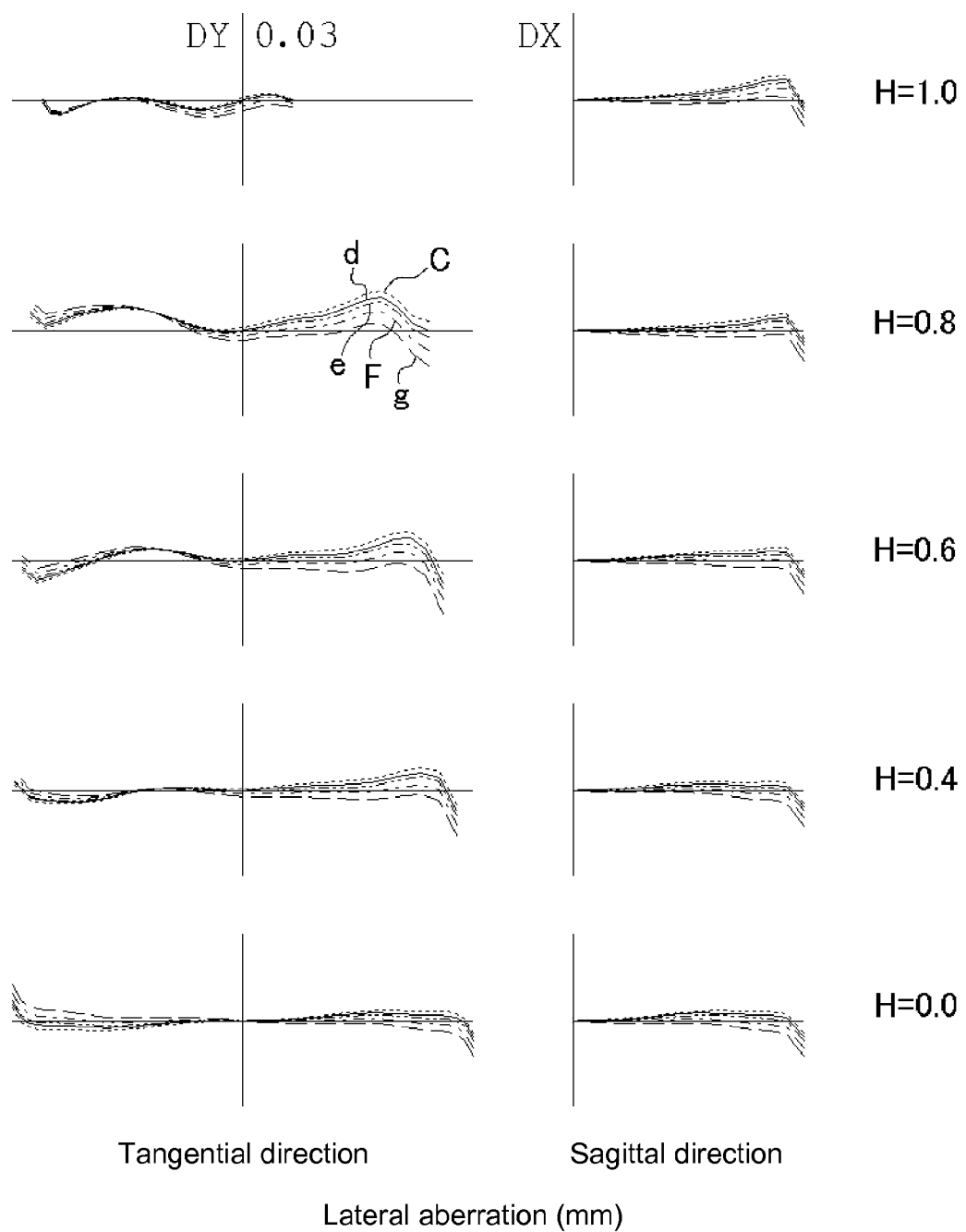
FIG. 11 is an aberration diagram showing a lateral aberration of the imaging lens of FIG. 10.
Figure 12:
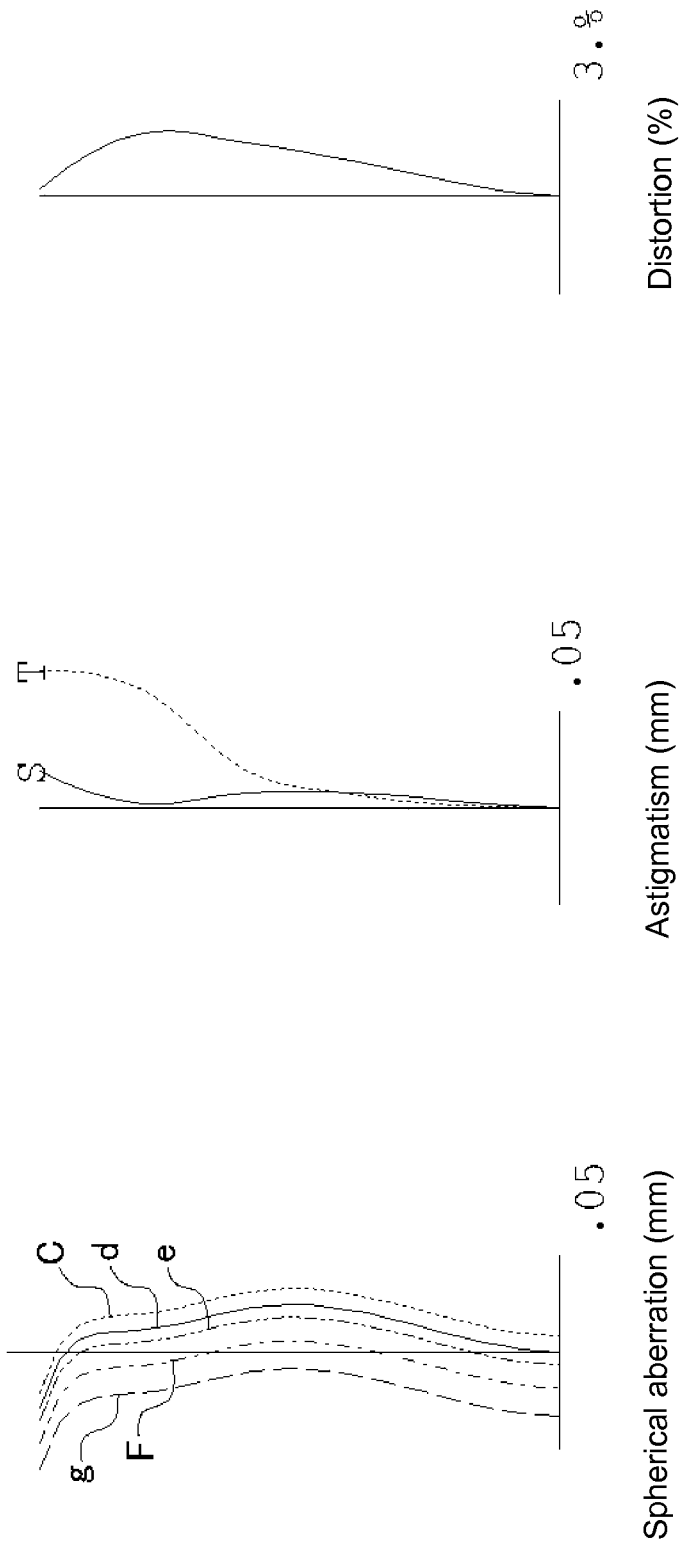
FIG. 12 is an aberration diagram showing a spherical aberration, an astigmatism, and a distortion of the imaging lens of FIG. 10.
Figure 13:
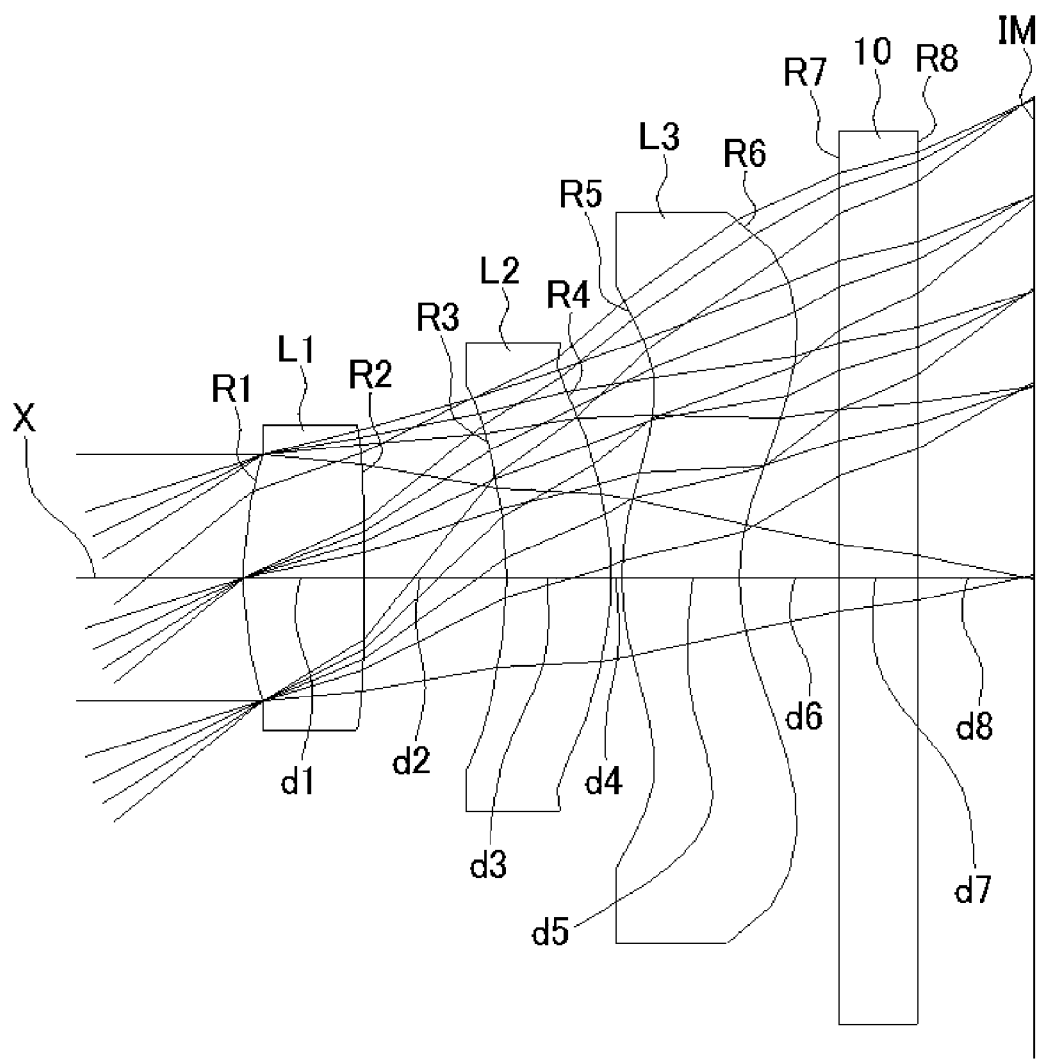
FIG. 13 is a schematic sectional view showing a configuration of an imaging lens in Numerical Data Example 5.

FIG. 11 is an aberration diagram showing the lateral aberration that corresponds to an image height ratio H, and FIG. 12 is an aberration diagram showing a spherical aberration (mm), an astigmatism (mm), and a distortion (%), respectively. As shown in FIGS. 11 and 12, in the imaging lens of Numerical Data Example 4, the respective aberrations are also suitably corrected.

Numerical Data Example 5

Basic lens data are shown below.

f = 1.59 mm, Fno = 2.4, ω = 38.9°
Unit: mm

Surface Data

| Surface Number i | R | d | Nd | vd |
|---|---|---|---|---|
| (Object) | ∞ | ∞ | | |
| 1* (Stop) | 1.020 (=R1f) | 0.321 | 1.4970 | 81.6 |
| 2* | −107.500 (32 R1r) | 0.383 (=D12) | | |
| 3* | −0.990 | 0.281 | 1.4970 | 81.6 |
| 4* | −0.877 | 0.027 | | |
| 5* | 0.674 | 0.316 | 1.5351 | 56.1 |
| 6* | 0.568 | 0.270 | | |
| 7 | ∞ | 0.210 | 1.5163 | 64.1 |
| 8 | ∞ | 0.310 | | |
| (Image plane) | ∞ | | | | f1 = 2.04 mm
f2 = 8.47 mm
f3 = 172.50 mm
f23 = 6.79 mm

Aspheric Surface Data

First Surface $k = -3.514$, $A_4 = 7.406E-02$, $A_6 = 1.782$, $A_8 = -2.510E+01$, $A_{10} = 6.532E+01$, $A_{12} = 2.379E+01$, $A_{14} = -1.163E+02$
Second Surface $k = 1.000E+01$, $A_4 = -6.251E-02$, $A_6 = -4.449$, $A_8 = 1.323E+01$, $A_{10} = -2.339E+01$, $A_{12} = -3.895$, $A_{14} = -2.019E+02$
Third Surface $k = -1.965E+01$, $A_4 = -6.090E-02$, $A_6 = 5.172$, $A_8 = -9.352E+01$, $A_{10} = 5.022E+02$, $A_{12} = -1.420E+03$, $A_{14} = 2.586E+03$, $A_{16} = -2.458E+03$ f = 1.59 mm, Fno = 2.4, ω = 38.9°
Unit: mm Fourth Surface $k = 8.398E-01$, $A_4 = 1.434$, $A_6 = -3.704$, $A_8 = 9.132E-01$, $A_{10} = 1.350E+01$, $A_{12} = 1.382E+01$, $A_{14} = 2.136E+01$, $A_{16} = -1.017E+01$
Fifth Surface $k = -2.984$, $A_4 = -8.335E-01$, $A_6 = -7.978E-01$, $A_8 = 2.134E-01$, $A_{10} = 2.016$, $A_{12} = -3.519E-01$, $A_{14} = -9.361E-01$, $A_{16} = 7.830E-01$
Sixth Surface $k = -2.147$, $A_4 = -1.030$, $A_6 = 9.282E-01$, $A_8 = -5.740E-01$, $A_{10} = -7.834E-03$, $A_{12} = -9.665E-02$, $A_{14} = 4.986E-01$, $A_{16} = -3.503E-01$ The values of the respective conditional expressions are as follows:

$f1/f=1.28$ $R1f/R1r=-0.009$ $f2/f3=0.049$ $f1/f23=0.30$ $D12/f=0.24$

Therefore, the imaging lens of Numerical Data Example 5 satisfies the conditional expressions (1) to (6). In addition, a distance along the optical axis X from the object-side surface of the first lens L1 (length in air) to the image plane IM is 2.05 mm, and therefore the size of the imaging lens is suitably reduced.

Figure 14:
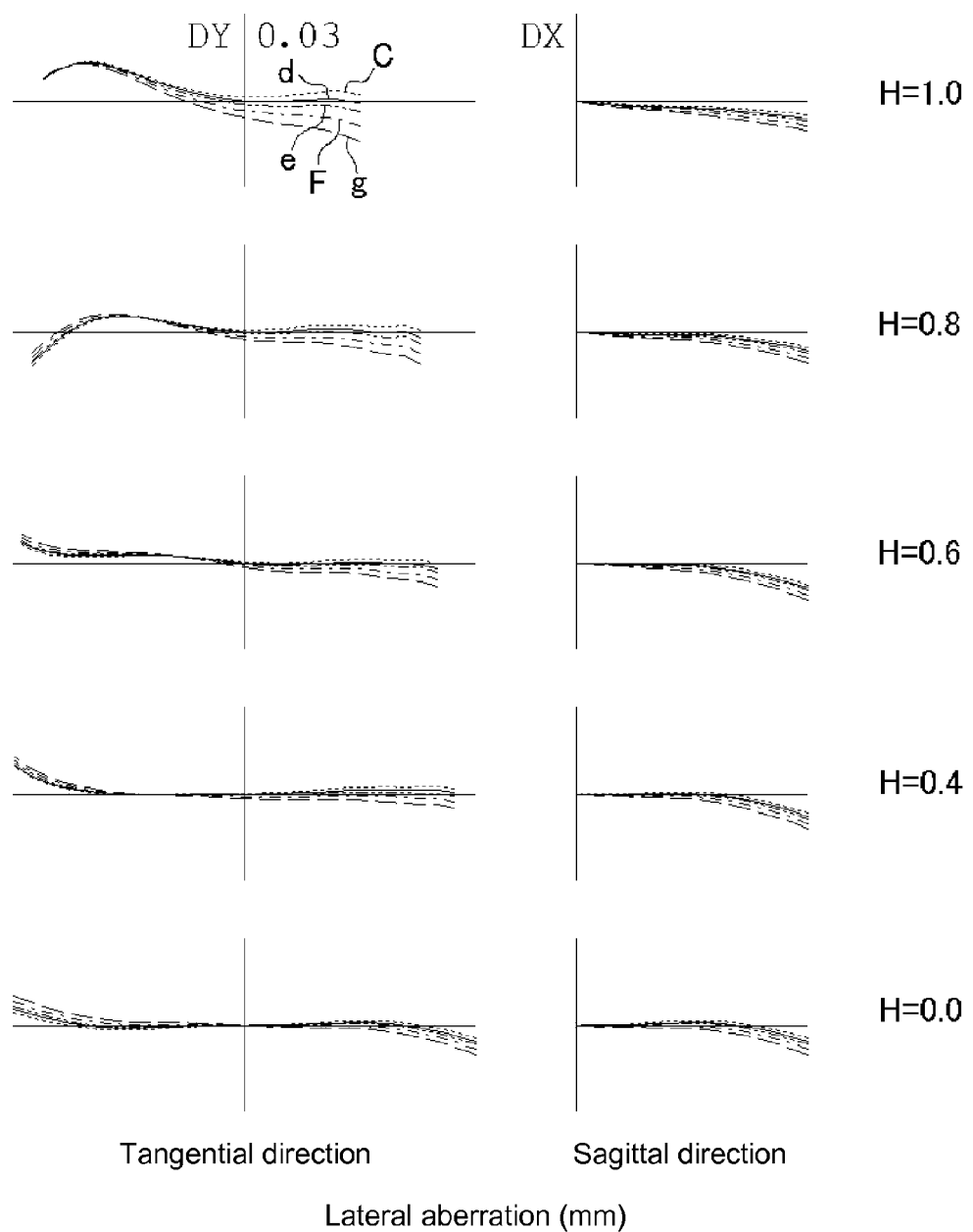
FIG. 14 is an aberration diagram showing a lateral aberration of the imaging lens of FIG. 13.
Figure 15:
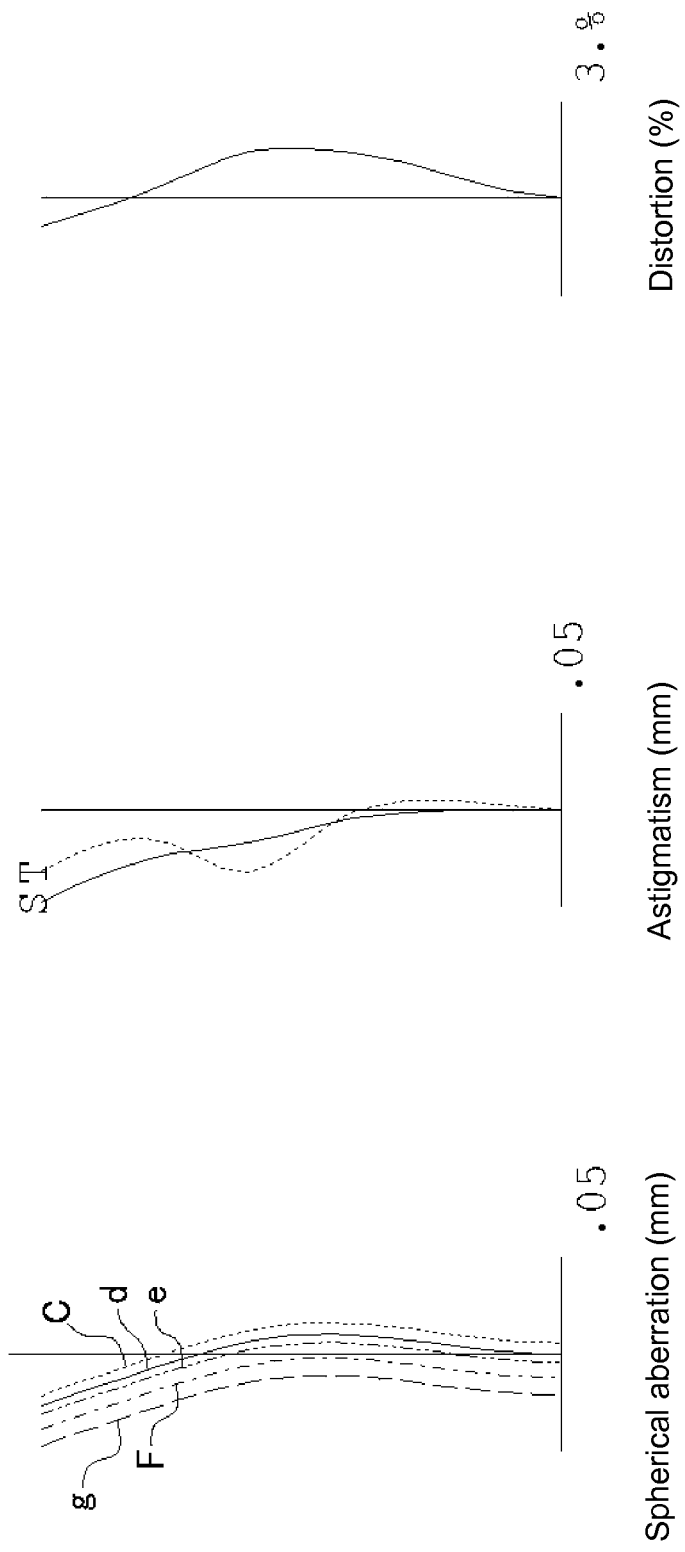
FIG. 15 is an aberration diagram showing a spherical aberration, an astigmatism, and a distortion of the imaging lens of FIG. 13.

FIG. 14 is an aberration diagram showing the lateral aberration that corresponds to an image height ratio H, and FIG. 15 is an aberration diagram showing a spherical aberration (mm), an astigmatism (mm), and a distortion (%), respectively. As shown in FIGS. 14 and 15, in the imaging lens of Numerical Data Example 5, the respective aberrations are also suitably corrected.

With diversification of functions of cellular phones and smartphones, an imaging lens to be mounted in a camera of those devices is even more required to attain wide angle than before. Mounting an imaging lens with a wide angle in a camera, it is possible to take a wide range of an image, as well as to cut out an image of a range desired by a user from an image taken in wide range upon fabrication. Since the imaging lens of the embodiment has relatively a wide angle of view, it is possible to fully meet those demands.

In addition, with advancement in miniaturization of cameras, small-sized imaging elements have been used for mounting in the cameras. In case of a small-sized imaging element, since a light receiving area of a pixel is generally small, an image could be dark in comparison with an image taken with a large imaging element that has the same number of pixels. As one of methods to solve such problem, there is a method of improving light receiving sensitivity of an imaging element using an electric circuit. However, when a light receiving sensitivity increases, a noise component that does not directly contribute to formation of images is also amplified, and another electric circuit is often required for reducing or removing noise. Since the imaging lens of this embodiment has relatively small F number, it is possible to obtain sufficiently bright image without those electric circuits. In addition, since the F number is small, it is possible to obtain a bright image even in relatively dark environment, so that it may be also possible to use cellular phones and smartphones in different applications than before.

In case of the imaging lens of the above-described Numerical Data Examples, the maximum image height of the image plane is 1.285 mm, and the imaging lens of each Numerical Data Example is combined with a small-sized imaging element, which is smaller than ⅕ inch. Combining the imaging lens of each Numerical Data Example with such small-sized imaging element, it is possible to suitably restrain sensitivity ((production error sensitivity) to deterioration of image-forming performance due to de-centering (axial displacement), tilting, or the like generated upon production of the imaging lens.

Accordingly, when the imaging lens of the embodiment is applied in an imaging optical system of a cellular phone, a smartphone, a digital still camera, a portable information terminal, a security camera, a document camera, a scanner, a network camera, and the like, it is possible to attain both the high performance and the small size for the camera.

The invention may be applicable to the imaging lens of a device that is required to have a small size, as well as satisfactory aberration correction ability, e.g., the imaging lenses to be mounted in a cellular phone, a digital still camera, or an imaging device, or in an imaging device.

The disclosure of Japanese Patent Application No. 2012-040877, filed on Feb. 28, 2012, is incorporated in the application by reference.

While the invention has been explained with reference to the specific embodiments of the invention, the explanation is illustrative and the invention is limited only by the appended claims.

What is claimed is:

1. An imaging lens comprising:
a first lens having positive refractive power;
a second lens having positive refractive power; and
a third lens having positive refractive power, arranged in the order from an object side to an image plane side,
wherein said first lens is formed in a shape so that a surface thereof on the object side has a positive curvature radius and a surface thereof on the image plane side has a negative curvature radius,
said second lens is formed in a shape so that a surface thereof on the object side and a surface thereof on the image plane side have negative curvature radii,
said third lens is formed in a shape so that a surface thereof on the object side and a surface thereof on the image plane side have positive curvature radii,
said third lens is formed in the shape so that the surface thereof on the object side and the surface thereof on the image plane side are respectively formed as aspheric surfaces having inflexion points, and
said first lens has a focal length f1, said second lens has a focal length f2, said third lens has a focal length f3, said first lens has the surface on the object side having the curvature radius R1$f$, and said first lens has the surface on the image plane side having the curvature radius R1$r$ so that the following conditional expressions are satisfied:

$$f1 < f2 < f3$$

$$1.0 < f1/f < 1.5$$

$$-0.02 < R1f/R1r < 0$$

where f is a focal length of a whole lens system.

2. The imaging lens according to claim 1, wherein said second lens has the focal length f2, and said third lens has the focal length f3 so that the following conditional expression is satisfied:

$$0.01 < f2/f3 < 0.05.$$

3. The imaging lens according to claim 1, wherein said first lens has the focal length f1, and said second lens and said third lens has a composite focal length f23 so that the following conditional expression is satisfied:

$$0.1 < f1/f23 < 0.4.$$

4. The imaging lens according to claim 1, wherein said first lens has the surface on the image plane side situated away from the surface of the second lens on the object side by a distance D12 so that the following conditional expression is satisfied:

$$0.2 < D12/f < 0.4.$$

5. The imaging lens according to claim 1, wherein each of said first lens, said second lens, and said third lens has an Abbe's number greater than 50.

6. The imaging lens according to claim 1, wherein each of said first lens, said second lens, and said third lens is formed of a same material.

7. An imaging device comprising the imaging lens according to claim 1 and an imaging element having an image plane with a size not larger than ⅕ inch and a resolution not greater than 3 megapixel.

* * * * *